UNITED STATES PATENT OFFICE.

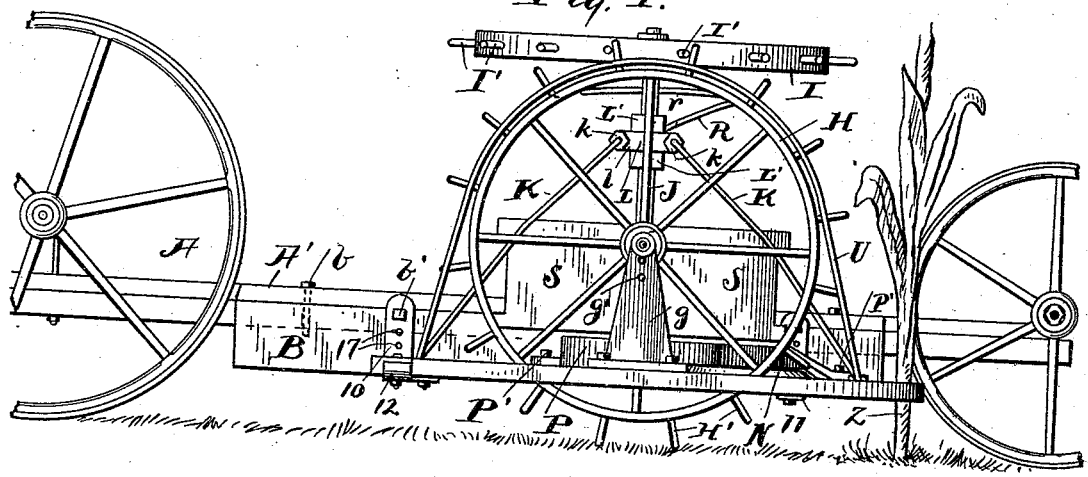

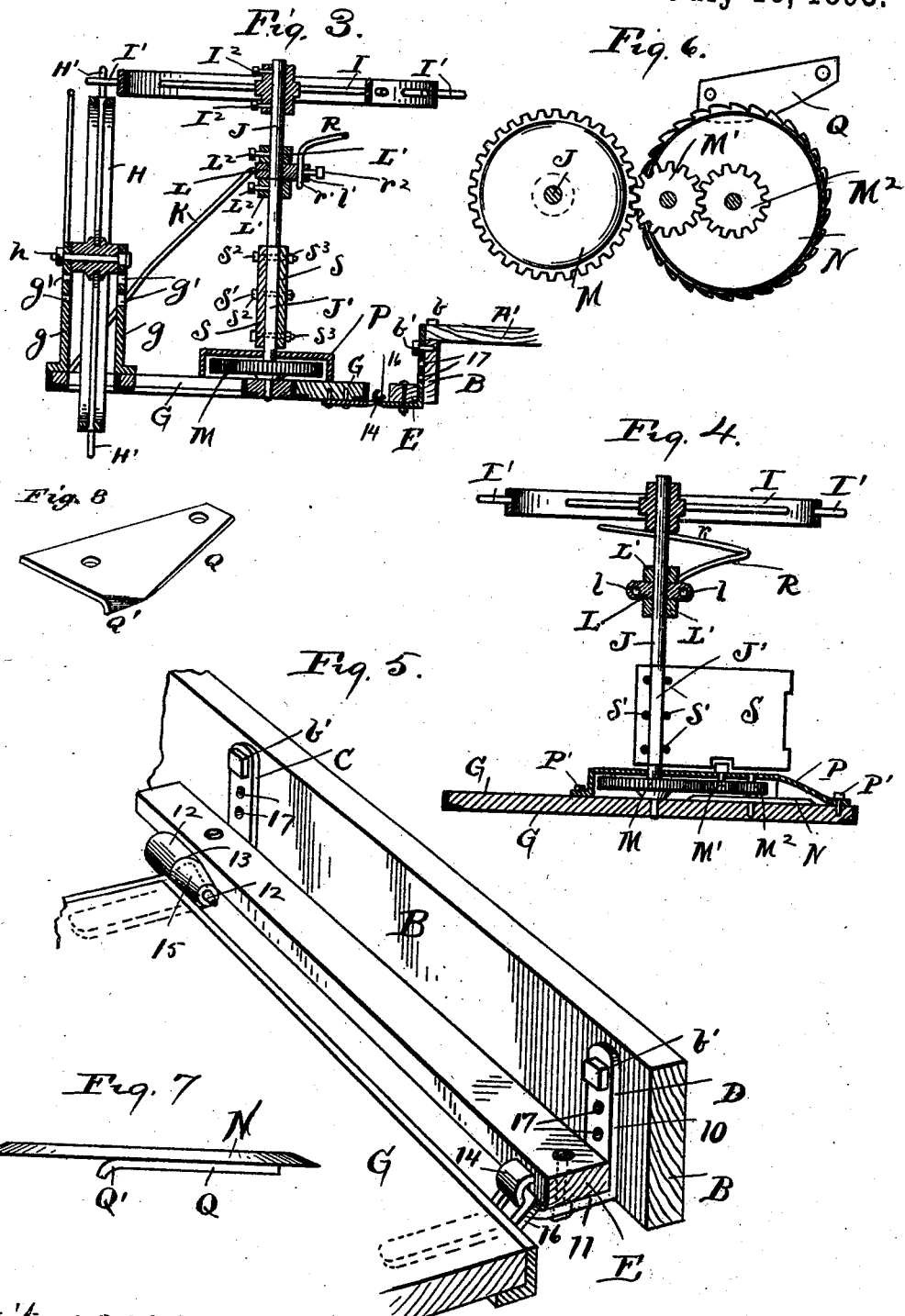

FRANKLIN LEONARD, OF CHADWICK'S MILLS, ASSIGNOR TO THE LEONARD MANUFACTURING COMPANY, OF NEW HARTFORD, NEW YORK.

HARVESTING-MACHINE.

SPECIFICATION forming part of Letters Patent No. 501,890, dated July 18, 1893.

Application filed June 16, 1892. Serial No. 436,920. (No model.)

*To all whom it may concern:*

Be it known that I, FRANKLIN LEONARD, of Chadwick's Mills, in the county of Oneida and State of New York, have invented certain new and useful Improvements in Harvesting-Machines; and I do hereby declare the following to be a full, clear, and exact description of the invention, such as will enable others skilled in the art to which it pertains to make and use the same.

My invention relates to improvements in harvesting - machines, more especially designed for harvesting corn; and my invention consists in certain novel features of construction and combination of parts which will be hereinafter described and pointed out in the claims.

In the accompanying drawings, Figure 1 is a left hand side-elevation of a harvesting machine, embodying my invention, hinged to a truck-wagon. Fig. 2 is a plan view of the same. Figs. 3 and 4 are vertical sections, taken, respectively, on lines 3—3, and 4—4, Fig. 2. Fig. 5 is an enlarged view in perspective showing the manner of hinging the machine to a wagon. Fig. 6 is a plan view of the cutters and mechanism that operatively connects the rotary cutter with shaft J. Fig. 7 is a side elevation of the cutters, illustrating the peculiarity in the construction of the stationary knife or cutter, and Fig. 8 is a perspective view of the stationary knife.

A represents a truck-wagon, and A' the wagon-platform that is hung below the axles of the wheels of the wagon.

B represents a beam or timber extending lengthwise of and bolted, as at $b$, to the bottom of the wagon-platform at the side where the harvesting machine is to be attached (see Figs. 1, 2 and 5) and C and D represent hangers, bolted as at $b'$, to beam or timber B at or near opposite ends of the latter and connected with each other preferably by means of a plank E, a preferable construction being shown in the drawings (see Fig. 5) wherein hangers C and D are angular in form, with the upright members 10 of the hangers bolted to the outer side of beam or timber B and with a plank E resting upon and rigidly secured (by bolts or otherwise) to the horizontal or approximately horizontal members 11 of the hangers. Members 11 of hangers C and D extend outside of plank E and terminate the one (of hanger C) in a forwardly-extending conical or tapering pintle 12 provided with a shoulder, as at 13, and member 11 of hanger D terminating in a hook 14.

G represents the platform or frame-work of the harvesting machine, the same being provided, at the side to be attached to the wagon, with a frusto - conical shaped thimble or knuckle 15 adapted to embrace the correspondingly shaped pintle 12 of hanger C and abut shoulder 13 of said pintle, and frame or platform G is also provided with an eye 16 adapted to engage hook 14 of hanger D. It will thus be observed that the frame-work or platform of the harvesting-machine is hinged to and supported by hangers C and D; that the machine is drawn forward with and at one side of the wagon upon which the corn-stalks are loaded as hereinafter described, and that by means of the construction indicated the machine is not only readily attachable and detachable from the machine but can be tilted on its hinges (12—15 and 14—16) over onto the wagon in moving it from place to place when not in use. At the opposite or outer side the harvesting machine is carried by a traction-wheel, H, that is rotatably mounted upon an axle or spindle, $h$, that has bearing in standards or uprights $g$ rigid with the framework of the machine. Wheel H is provided with spurs, pins or arms, H', projecting radially at equal intervals from the rim of said wheel, said spurs or pins being adapted to interlock with and engage corresponding pins, spurs or arms I' projecting radially from the rim of a horizontal reel-wheel I, operatively mounted, in any suitable manner, on the upper end of a vertical shaft J supported by the frame-work and a pair of braces K, that are composed preferably of rods secured at their lower ends to the frame-work forward and rearward of shaft J, respectively; the opposite or upper ends of said braces and at the forward and rear sides of shaft J, respectively, extending freely through laterally-projecting horizontally-perforated ears $l$ of a sleeve L, that is loosely mounted on shaft J and adjustable endwise of said shaft, but retained in the desired adjustment by means of collars L' mounted upon shaft J at opposite ends of sleeve L, respectively, and secured to the shaft by set-screws L². Braces K, (see Fig. 2) at opposite sides of the respective ear L, are provided, with nuts k (the braces being screw threaded for the purpose) by means of which the braces may be adjusted as required to establish the verticality of shaft J, and said braces are sufficiently yielding to accommodate themselves to the adjustment of sleeve L endwise of said shaft. The horizontal reel-wheel is secured to shaft J preferably by a pair of set-screws, I², (see Fig. 3) and hence is adjustable endwise of shaft J.

M represents a spur-gear that is operatively mounted on the lower end of shaft J and adapted to communicate motion through an intermediate gear M' to a gear M² that has operatively connected therewith a rotary cutter N concentric with said gear, and located at the angle of a V-shaped slot or opening O at the front of frame-work or platform G, said gearing, to exclude dust, dirt, &c., being inclosed as shown, by a metallic casing P, secured, as at P', to platform G. The frame-work or platform G is composed preferably of angle-iron partially filled in, as required with boards. (See Figs. 2, 3, and 4.)

Q represents a stationary knife secured to frame-work or platform G, said knife, (see Figs. 2, 6, and 7) partially overlapping the under side of rotary cutter N as shown and being adapted to act in conjunction with said rotary cutter. A feature in the construction of stationary knife, of no inconsiderable importance, consists in the downward bend, Q' of the rear end of the cutting-edge of said knife, as shown in Fig. 7, whereby is facilitated the escape of any matter that might otherwise clog or bind between the knives or cutters and render them inoperative.

Sleeve L, at the inner side, that is, at the side presenting toward the wagon, has a laterally-projecting vertically perforated ear or member l', and R represents a guard-arm that extends from ear or member l' to the rim of reel-wheel I and thence extends rearwardly, as at r, and terminates outside of the path of radially-projecting pins, spurs or arms I' of said wheel, the same being adapted to engage the severed corn-stalks and throw or direct them off wheel I and cause them to fall or drop onto the platform of the wagon upon which they are loaded. A preferable construction is shown in the drawings, (see Figs. 2 and 3) wherein guard-arm R, at its inner end, is bent, as at r', downwardly through the perforation in ear l' of sleeve L and secured by means of a set-screw r², thereby being adjustable in a horizontal plane so as to come into engagement with the severed corn-stalks sooner or later as desired.

Next above casing P that incloses the gearing that operatively connects the rotary knife or cutter with shaft J, the latter has a square section J', to which and at opposite sides thereof, respectively, are secured two wings, S, preferably by two series of bolts S' as shown in Figs. 3 and 4, the heads S² of said bolts abutting the outer side of one wing, nuts S³ being mounted upon said bolts and abutting the outer side of the other wing, and the two series of bolts passing astride opposite sides, respectively, of said square section of the shaft. Wings S are adapted to engage the butt-ends of the stalks when dropped upon the wagon-platform and shove or beat the same upon said platform.

The adjustable feature of guard-arm R hereinbefore referred to, is a matter of considerable importance. The wagon is loaded from rear to front. Now, at the commencement of loading, it is desirable to have the stalks thrown upon the wagon as far as practicable toward the rear end thereof, which is accomplished by adjusting said guard-arms so as to permit the spurs, pins or arms I' of wheel I to carry the stalks farther rearward before coming into engagement with said guard-arm, causing the stalks to drop upon the wagon quite diagonally crosswise of the latter and toward its rear end, the butt-ends of the stalks being shoved rearward by wings S and when the rear portion of the wagon has been loaded by changing the position of said guard-arm so as to sooner come into engagement with the stalks, the latter are thrown or dropped crosswise of the wagon more at right angles to the length of the wagon, and hence nearer the forward end of the wagon. Furthermore said adjustable guard-arm will be found invaluable in case the machine is traveling with and against the wind, especially in the case of heavy winds. In case of a heavy head-wind, guard-arm R should be adjusted more forward as, for instance, shown in solid lines Fig. 2, regardless of the direction in which the stalks drop upon the wagon, to avoid the stalks being blown down at the side of the wagon, and in case of a heavy wind in the opposite direction, said arms should be adjusted more rearward, as for instance, shown in dotted lines, Fig. 2, to prevent the stalks being blown down forward.

To enable the machine to cut the stalks at different elevations from the ground, uprights or standards g that support the axle or spindle upon which traction-wheel H is mounted, are provided each with a series of holes g' located at different elevations from the ground, and the holes of the series of holes in the one upright or standard register with the respective holes of the series in the other upright or standard, and hangers C and D that support the opposite side of the machine are likewise provided with a series of holes 17 located at different elevations from the ground and at intervals apart corresponding with the intervals between holes g' in uprights g, holes g' being adapted to receive the traction-wheel axle and holes 17 being adapted to receive the securing bolts of hangers C and D; hence by elevating or lowering the traction-wheel by removing its axle from one elevation to another for which provision has been made as just described, and by elevating or lowering hangers C and D a corresponding distance the machine will be correspondingly raised or lowered, and be adapted to cut the stalks farther from or closer to the ground as desired, and by means of the vertical adjustability of reel-wheel I, sleeve L and attachments hereinbefore indicated, said parts, upon adapting the machine to cut at a different elevation as just described, are readily adjusted, as may be required.

From the foregoing description the operation of my improved machine will be readily understood. Briefly described, it is as follows:—The machine proper having been attached to the wagon, by hinging the same thereto, as hereinbefore described, the latter is ready for operation, and as the same is drawn forward by the team attached to the wagon, the machine is moved so that the row of corn will be in line with the V-shaped slot or opening in the front of its frame or platform G and as the machine reaches the corn the latter is engaged by the cutters and severed. The pins, spurs or arms I' of reel-wheel I carry the severed stalks laterally or sidewise and guard-arm R causes them to become disengaged from pins, spurs or arms I' of said reel-wheel, and drop onto the wagon, whereupon wings S engage the butt-ends of the stalks and push or beat the same onto the wagon. The machine is more particularly intended for operating on corn in rows or drills; the position of the rows being operated upon being shown at Z, and of the next adjacent row at Z'.

U represents a fender secured to frame G outside of traction-wheel H, the same being preferably of the form shown (see Fig. 1) and adapted to protect the row of corn next adjacent that being operated upon.

Although I prefer the construction shown, I desire to have it understood that slight modifications may be made without departing from the spirit and purpose of my invention. For instance, the arrangement of the hinged connection between the frame or platform of the harvesting machine and the wagon might be reversed, that is, hangers C and D might be provided with knuckle and eye 13 and 16, respectively, and the frame or platform of the machine might be provided with pintle 12 and hook 14, for engaging said knuckle and eye, respectively.

What I claim is—

1. In a harvesting-machine adapted, at one side, to be detachably connected with a wagon, the combination with a traction-wheel adapted to carry the outer or opposite side of the machine, of a horizontal or approximately horizontal reel-wheel, the rim whereof is provided with radially-projecting-pins, spurs or arms, I', the traction wheel aforesaid being provided with similar pins, spurs or arms, adapted to interlock with and actuate pins, spurs or arms of said horizontal reel-wheel and communicate motion to the latter, substantially as and for the purpose set forth.

2. In a harvesting machine adapted to be detachably connected with the one side of the wagon and to be drawn by said wagon, the combination with a traction-wheel for carrying the outer or opposite side of the machine, of a vertical shaft, J, and a horizontal reel-wheel, I, mounted upon said shaft and provided with radially-projecting pins, spurs or arms, I', the aforesaid traction-wheel being provided with similar pins, spurs or arms, H', adapted to interlock with members I' of the horizontal reel-wheel and communicate motion to the latter, the arrangement of parts being substantially as described and for the purpose set forth.

3. In a harvesting machine, the combination with a traction-wheel, of a vertical shaft, J, a horizontal reel-wheel mounted on said shaft and provided with radially-projecting pins spurs or arms, adapted to be engaged and actuated by similar pins, spurs or arms, of the traction wheel aforesaid, a sleeve, L, adjustably mounted on said shaft, braces K secured at their lower ends to the frame or platform of the machine and adjustably secured at their upper ends to sleeve L, substantially as shown and described.

4. In a harvesting machine, the combination with a traction-wheel, H, a vertical shaft, J, a reel-wheel, I, mounted on said shaft and adapted to be driven by said traction-wheel, the traction and reel wheels each provided with peripheral pins adapted to strike one another whereby one wheel is driven by the other, of a rotary cutter, N, intergeared with said vertical shaft, the arrangement of parts being substantially as shown and described.

5. In a harvesting machine, the combination with a reel-wheel, provided with radially-projecting pins, spurs or arms adapted to engage the stalks and carry them sidewise, of a guard-arm, R, adapted to cause the stalks to be disengaged from the reel-wheel and cause them to fall or drop, substantially as described, said guard-arm being adjustable in a horizontal plane so as to come into engagement with the severed stalks sooner or later as desired, substantially as and for the purpose set forth.

6. In a harvesting machine, the combination of a stationary knife, Q, a rotary cutter, N, a vertical shaft, J, intergeared with said rotary cutter, a horizontal reel-wheel, I, operatively mounted on said shaft, a traction-wheel, H, said reel-wheel and traction wheel each provided with peripheral projections adapted to drive said horizontal reel-wheel, and a guard-arm R, the arrangement of parts being substantially as shown and described and for the purpose set forth.

7. In a harvesting machine, the combination with a vertical shaft, J, a horizontal reel-wheel, I, mounted on said shaft and provided with radially-projecting pins, spurs or arms, I', a sleeve L, mounted on said shaft and provided with a laterally-projecting vertically-perforated ear or member l', of a guard-arm, R, adjustably secured in the perforation of member l', substantially as indicated, thence extending to the rim of reel-wheel I, and thence rearwardly, and terminating outside of the path of radially-projecting pins, spurs or arms I', of said reel-wheel, substantially as shown and for the purpose set forth.

8. In a harvesting machine, the combination with a traction-wheel, H, having peripheral pins H' a vertical shaft, J, a horizontal reel-wheel, I, having peripheral pins I', said wheel operatively mounted on said vertical shaft and adapted to be actuated by said traction-wheel, by the pins of one wheel striking the pins on the other of a pair of wings, S, secured to said shaft, substantially as and for the purpose set forth.

9. In a harvesting machine, the combination with a traction-wheel, having peripheral pins a vertical shaft, J, a horizontal reel-wheel having peripheral pins, said wheel operatively mounted on said shaft and adapted to be driven by said traction-wheel, said shaft having a square section, J', of a pair of wings, S, secured to said square section substantially as shown and described.

In testimony whereof I sign this specification, in the presence of two witnesses, this 13th day of May, 1892.

FRANKLIN LEONARD.

Witnesses:
 LYNOTT B. ROOT,
 C. LANSING JONES.